United States Patent
Roffe et al.

(10) Patent No.: US 11,118,626 B2
(45) Date of Patent: Sep. 14, 2021

(54) MULTI-PART BEARING CAGE ASSEMBLY

(71) Applicant: Schaeffler Technologies AG & Co. KG, Herzogenaurach (DE)

(72) Inventors: Dennis Roffe, Fort Mill, SC (US); Michael Heaton, Rock Hill, SC (US); Guihui Zhong, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/751,917

(22) Filed: Jan. 24, 2020

(65) Prior Publication Data
US 2021/0231173 A1    Jul. 29, 2021

(51) Int. Cl.
*F16C 19/06* (2006.01)
*F16C 33/38* (2006.01)
*F16C 33/46* (2006.01)
*F16C 43/06* (2006.01)
*F16C 33/41* (2006.01)

(52) U.S. Cl.
CPC .......... *F16C 33/3831* (2013.01); *F16C 19/06* (2013.01); *F16C 33/3875* (2013.01); *F16C 33/3887* (2013.01); *F16C 33/418* (2013.01); *F16C 33/4641* (2013.01); *F16C 33/4652* (2013.01); *F16C 43/06* (2013.01)

(58) Field of Classification Search
CPC ...... F16C 19/06; F16C 43/06; F16C 33/3831; F16C 33/3887; F16C 33/418; F16C 33/4641; F16C 33/4652
USPC .......... 384/470, 523, 531, 529, 539
See application file for complete search history.

(56) References Cited

U.S. PATENT DOCUMENTS

| 6,416,230 | B1 | 7/2002 | Staudigel et al. | |
| 7,703,986 | B2* | 4/2010 | Naito | F16C 33/44 384/526 |
| 9,512,880 | B2* | 12/2016 | Yasuda | F16C 33/3875 |
| 10,247,241 | B2* | 4/2019 | Taniguchi | F16C 33/3875 |
| 2017/0108043 | A1* | 4/2017 | Mocnik | F16C 33/3875 |
| 2017/0292567 | A1* | 10/2017 | Taniguchi | F16C 33/38 |
| 2018/0010637 | A1* | 1/2018 | Taniguchi | F16C 19/06 |

FOREIGN PATENT DOCUMENTS

| CN | 204003990 U | * | 12/2014 | |
| DE | 3341970 C2 | * | 5/1991 | F16C 33/3875 |
| DE | 4227474 A1 | * | 2/1994 | F16C 33/3875 |
| DE | 102009038794 A1 | * | 3/2011 | F16C 33/62 |
| DE | 102012222800 A1 | * | 6/2014 | F16C 33/3875 |
| DE | 102014212267 A1 | * | 12/2015 | F16C 33/491 |
| EP | 1010909 A1 | * | 6/2000 | F16C 33/3875 |
| EP | 3179122 A1 | | 6/2017 | |
| GB | 2550420 A | * | 11/2017 | F16C 19/26 |
| JP | 2008121817 A | * | 5/2008 | F16C 33/3875 |

(Continued)

*Primary Examiner* — Marcus Charles
(74) *Attorney, Agent, or Firm* — Volpe Koenig

(57) ABSTRACT

A bearing cage assembly including two different cage halves formed from different materials is disclosed. The first cage half includes a first rim and a first plurality of arms extending from the first rim. The second cage half includes a second rim and a second plurality of arms extending from the second rim. The first cage half and the second cage half are fastened to each other via engagement between a plurality of first retainers of the first cage half with the plurality of second retainers of the second cage half.

17 Claims, 8 Drawing Sheets

(56) References Cited

FOREIGN PATENT DOCUMENTS

| JP | 2013213555 A | * | 10/2013 | ........... F16C 33/3887 |
| JP | 2015017710 A | * | 1/2015 | ........... F16C 33/3875 |
| WO | WO-2012085842 A2 | * | 6/2012 | ............ F16C 33/583 |

* cited by examiner

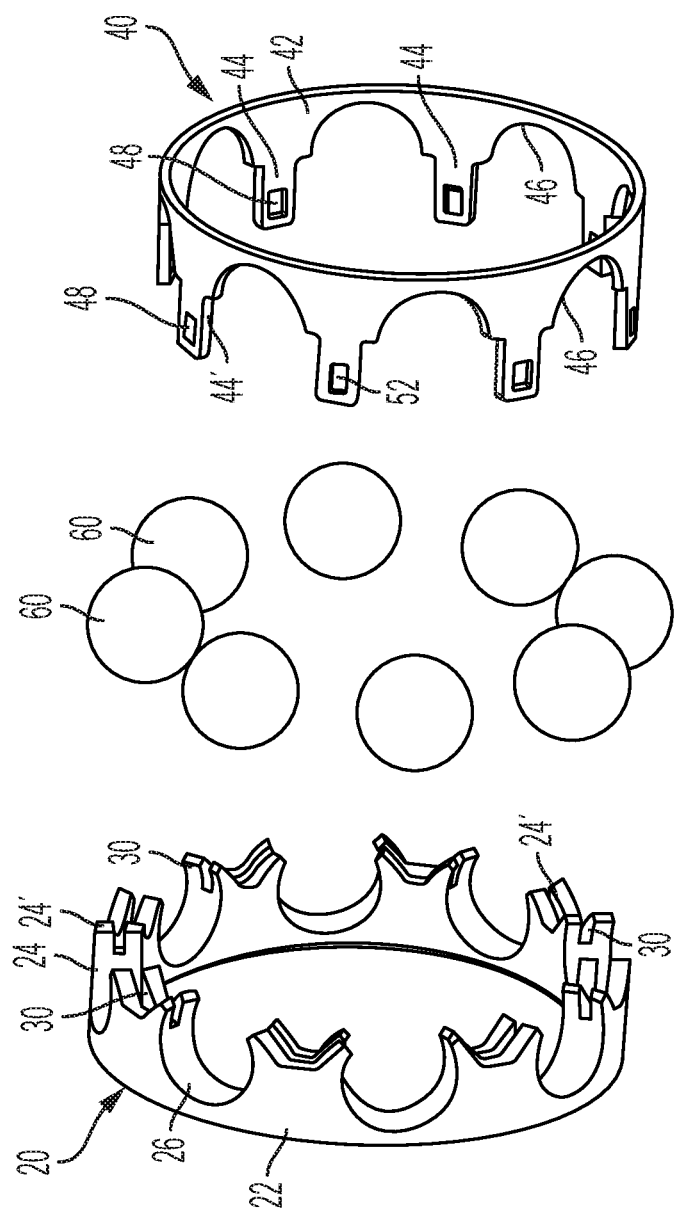

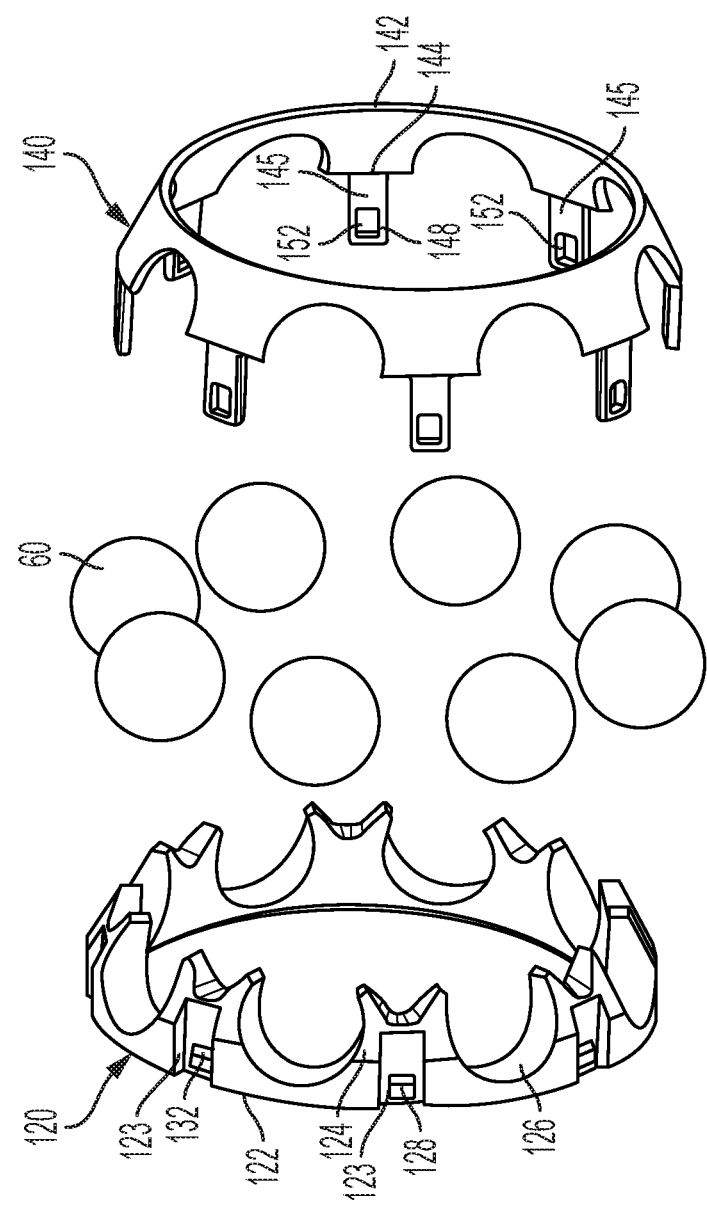

MULTI-PART BEARING CAGE ASSEMBLY

FIELD OF INVENTION

The present disclosure relates to a bearing cage.

BACKGROUND

Bearing arrangements are well known. In certain bearing arrangements, cages are provided to retain rolling elements, such as ball bearings. Due to varying performance requirements, bearing arrangements may require very durable cages, which are capable of supporting the rolling elements while running at high speeds.

Known cage designs include a two piece metal cage that is joined via rivets or a single plastic cage that only encases one side of the rolling elements. Both of these types of designs cannot handle the stresses of high speed applications, such as electric motors.

Accordingly, there is generally a need for an improved cage arrangement for bearings that is capable of withstanding high speeds.

SUMMARY

A bearing cage assembly including two different cage halves formed from different materials is disclosed. The first cage half includes a first rim and a first plurality of arms extending from the first rim. Adjacent arms of the first plurality of arms define a rolling element pocket half of a first plurality of rolling element pocket halves, and a plurality of first retainers are defined between the first plurality of rolling element pocket halves. The second cage half includes a second rim and a second plurality of arms extending from the second rim. Adjacent arms of the second plurality of arms define a rolling element pocket half of a second plurality of rolling element pocket halves, and a plurality of second retainers defined between the second plurality of rolling element pocket halves. The first cage half and the second cage half are fastened to each other via engagement between the plurality of first retainers with the plurality of second retainers.

In one embodiment, the first cage half is formed from plastic and the second cage half is formed from metal.

In another embodiment, a quantity the first plurality of rolling element pocket halves is equal to a quantity of the plurality of first retainers; and a quantity of the second plurality of rolling element pocket halves is equal to a quantity of the plurality of second retainers.

In one embodiment, first axial ends of the first plurality of arms each include a circumferentially extending slot defining a first one of a pocket or a protrusion, and second axial ends of the second plurality of arms each include a second one of a pocket or a protrusion.

In another embodiment, first axial ends of the first plurality of arms each include a circumferentially extending slot defining a pocket, and second axial ends of the second plurality of arms each include a protrusion dimensioned to be received within the pocket.

In one embodiment, the first rim includes a plurality of recesses circumferentially aligned with the first plurality of arms and the plurality of recesses extend in a radially inward direction. The plurality of first retainers each are arranged within a respective recess of the plurality of recesses, and the plurality of first retainers extend in a radially outward direction from the first rim.

In another embodiment, the first plurality of arms each include an angled surface that is angled at a first angle, the second plurality of arms of the second cage are angled radially outwardly from the second rim by a second angle, and the first angle and the second angle are within 10% of each other.

In one embodiment, a plurality of fingers each extend from a respective arm of the second plurality of arms, and the plurality of fingers have a narrower width than a width of the second plurality of arms.

In another embodiment, the first rim includes a plurality of recesses circumferentially aligned with the first plurality of arms, the plurality of first retainers are arranged within a respective recess of the plurality of recesses, and the plurality of fingers are dimensioned to be received within a respective one of the plurality of recesses.

In one embodiment, the plurality of first retainers are formed as a plurality of protrusions, the plurality of fingers define a plurality of pockets as the plurality of second retainers, and the plurality of pockets are each dimensioned to receive a respective one of the plurality of protrusions.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 1D is an exploded view of the bearing cage assembly of FIGS. 1A-1C.

FIG. 2D is an exploded view of the bearing cage assembly of FIGS. 2A-2C.

DETAILED DESCRIPTION OF THE PREFERRED EMBODIMENTS

Figure 1A:
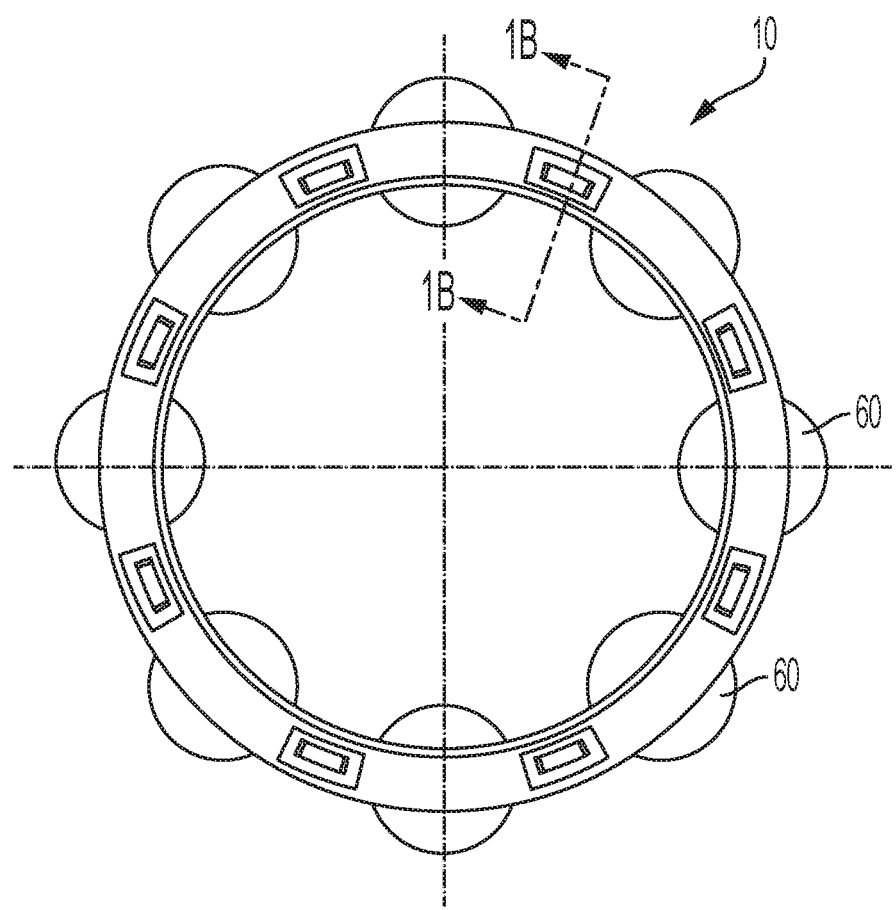
FIG. 1A is a front plan view of a bearing cage assembly according to a first embodiment.
Figure 1B:
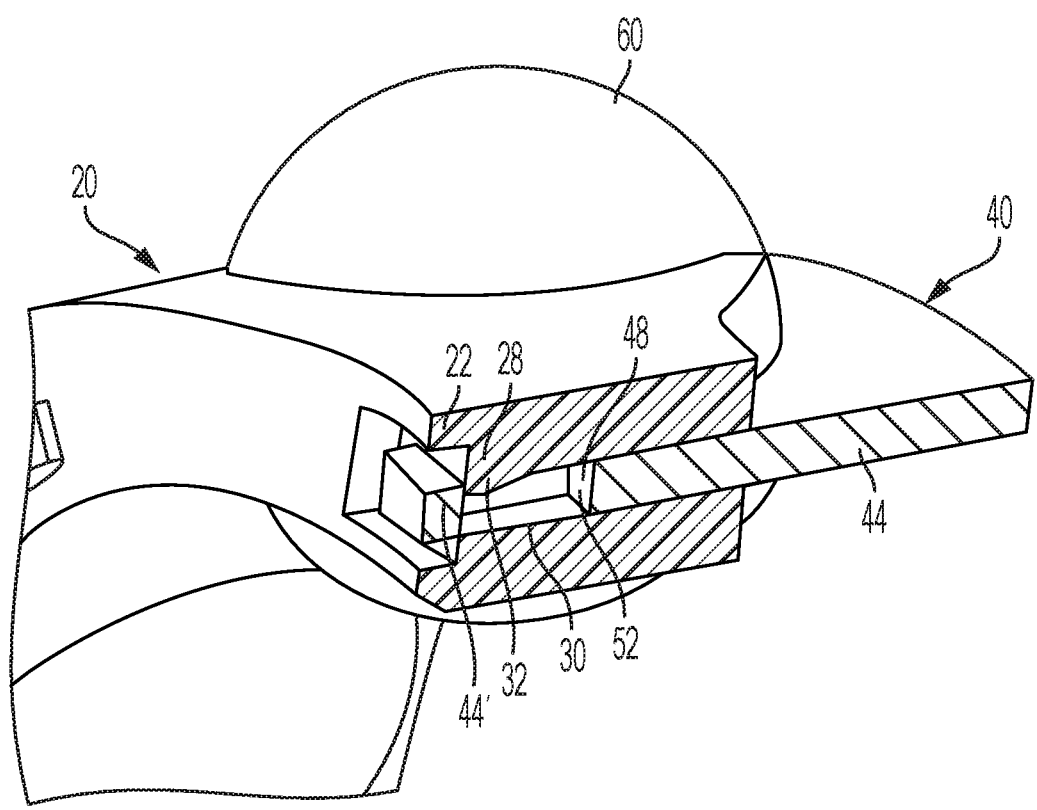
FIG. 1B is a cross-sectional view of the bearing cage assembly along line 1B-1B from FIG. 1A.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing cage assembly 10, 110 is disclosed herein that generally includes two cage halves being formed from different material. The two cage halves are arranged on opposite axial sides of rolling elements securing by pockets defined by the two cage halves. In other words, the bearing cage assembly 10, 110 is a two-sided, hybrid (i.e. formed from at least two different materials) bearing cage assembly. The two cage halves are joined to each other via retainers, which in one embodiment provide a snap-fit connection. Details of the bearing cage assemblies 10, 110 are described in more detail herein.

As shown in FIGS. 1A-1D and 2A-2D, the cage assembly 10, 110 includes a first cage half 20, 120 formed from a first material. The first cage half 20, 120 includes a first rim 22, 122 and a first plurality of arms 24, 124 extending from the first rim 22, 122. Adjacent arms of the first plurality of arms 24, 124 define a rolling element pocket half 26, 126 of a first plurality of rolling element pocket halves 26, 126. A plurality of first retainers 28, 128 are defined between the first plurality of rolling element pocket halves 26, 126. The term retainer is used herein to refer to any component capable of physical retention with another component. In one embodiment, the retainer includes an arm with a groove. In another embodiment, the retainer includes an opening or recess configured to receive or engage with another component. The retainer can be configured to mate with another component via a press fit, friction fit, or interference fit.

A second cage half 40, 140 is provided to complete the bearing cage assembly 10, 110. The second cage half 40, 140 is formed from a second material that is different from the first material. The second cage half 40, 140 includes a second rim 42, 142 and a second plurality of arms 44, 144 extending from the second rim 42, 142. Adjacent arms of the second plurality of arms 44, 144 define a rolling element pocket half 46, 146 of a second plurality of rolling element pocket halves 46, 146. A plurality of second retainers 48, 148 are defined between the second plurality of rolling element pocket halves 46, 146.

The first cage half 20, 120 and the second cage half 40, 140 are fastened to each other via engagement between the plurality of first retainers 28, 128 with the plurality of second retainers 48, 148. The plurality of first retainers 28, 128 are integrally formed with the first cage half 20, 120 and the plurality of second retainers 48, 148 are integrally formed with the second cage half 40, 140. In other words, no external fastening components, such as screws, rivets, bolts, etc., are required to join the first cage half 20, 120 and the second cage half 40, 140.

In one embodiment, the first cage half 20, 120 is formed from plastic and the second cage half 40, 140 is formed from metal. One of ordinary skill in the art would understand that the first cage half 20, 120 can be formed from metal and the second cage half 40, 140 can be formed from plastic. In one embodiment, the metal for forming the second cage half 40, 140 is steel, and the plastic for forming the first cage half 20, 120 is a high performance polyamide.

In one embodiment, a quantity the first plurality of rolling element pocket halves 26, 126 is equal to a quantity of the plurality of first retainers 28, 128; and a quantity of the second plurality of rolling element pocket halves 46, 146 is equal to a quantity of the plurality of second retainers 48, 148. This configuration ensures that retainers are provided between each of the rolling element pockets, and provides a more reliable connection between the cage halves.

As shown in FIG. 1D, first axial ends 24' of the first plurality of arms 24 each include a circumferentially extending slot 30 defining a first one of a pocket or a protrusion 32, and second axial ends 44' of the second plurality of arms 44 each include a second one of a pocket or a protrusion 52.

In one embodiment, the first axial ends 24' of the first plurality of arms 24 each include a circumferentially extending slot 30 defining a protrusion 32, and second axial ends 44' of the second plurality of arms 44 each include a pocket 52 dimensioned to receive the protrusion 32. Engagement of the protrusion 32 within the pocket 52 is more clearly shown in FIG. 1B.

In the embodiment of FIGS. 2A-2D, the first rim 122 includes a plurality of recesses 123 circumferentially aligned with the first plurality of arms 124. The plurality of recesses 123 extend in a radially inward direction, and the plurality of first retainers 128 are arranged within a respective recess of the plurality of recesses 123. The plurality of first retainers 128 extend in a radially outward direction from the first rim 122.

The first plurality of arms 124 each include an angled surface 125 that is angled at a first angle $\theta_1$, the second plurality of arms 144 of the second cage 140 are angled radially outwardly from the second rim 142 by a second angle $\theta_2$. In one embodiment, the first angle $\theta_1$ and the second angle $\theta_2$ are within 10% of each other. This angled configuration both helps stiffen the cage assembly and supports flexing of the arms 144.

As shown in FIG. 2D, a plurality of fingers 145 extending from a respective arm of the second plurality of arms 144, and the plurality of fingers 145 having a narrower width than a width of the second plurality of arms 144. The first rim 122 includes a plurality of recesses 123 circumferentially aligned with the first plurality of arms 124, and the plurality of first retainers 128 are arranged within a respective recess of the plurality of recesses 123. The plurality of fingers 145 each are dimensioned to be received within a respective one of the plurality of recesses 123.

As shown in FIGS. 2A-2D, the plurality of first retainers 128 are formed as a plurality of protrusions 132, and the plurality of fingers 145 define a plurality of pockets 152 as the plurality of second retainers 148. The plurality of pockets 152 are each dimensioned to receive a respective one of the plurality of protrusions 132.

Figure 1C:
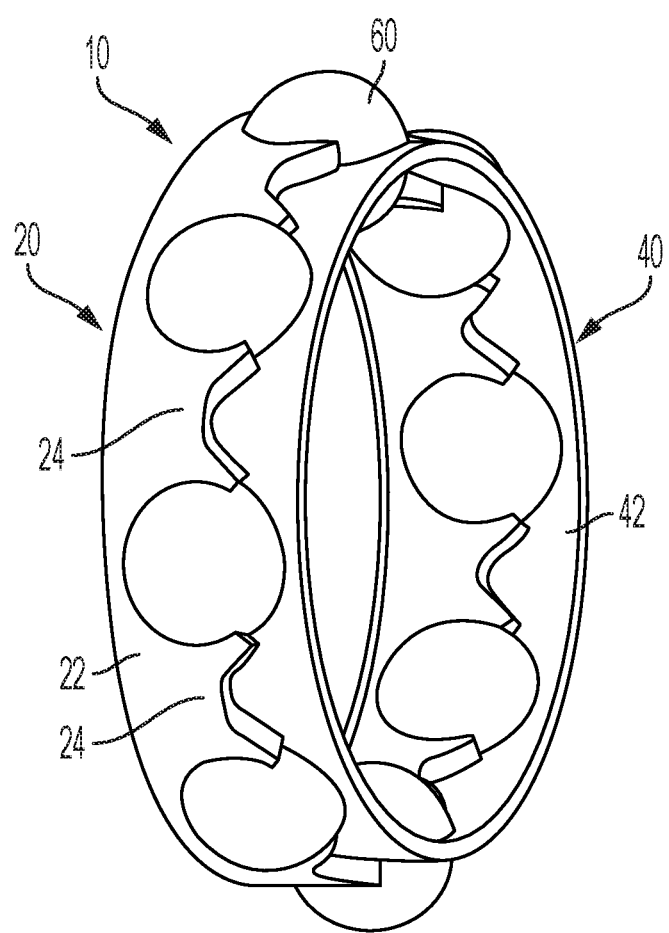
FIG. 1C is a perspective view of the bearing cage assembly of FIGS. 1A and 1B.
Figure 2A:
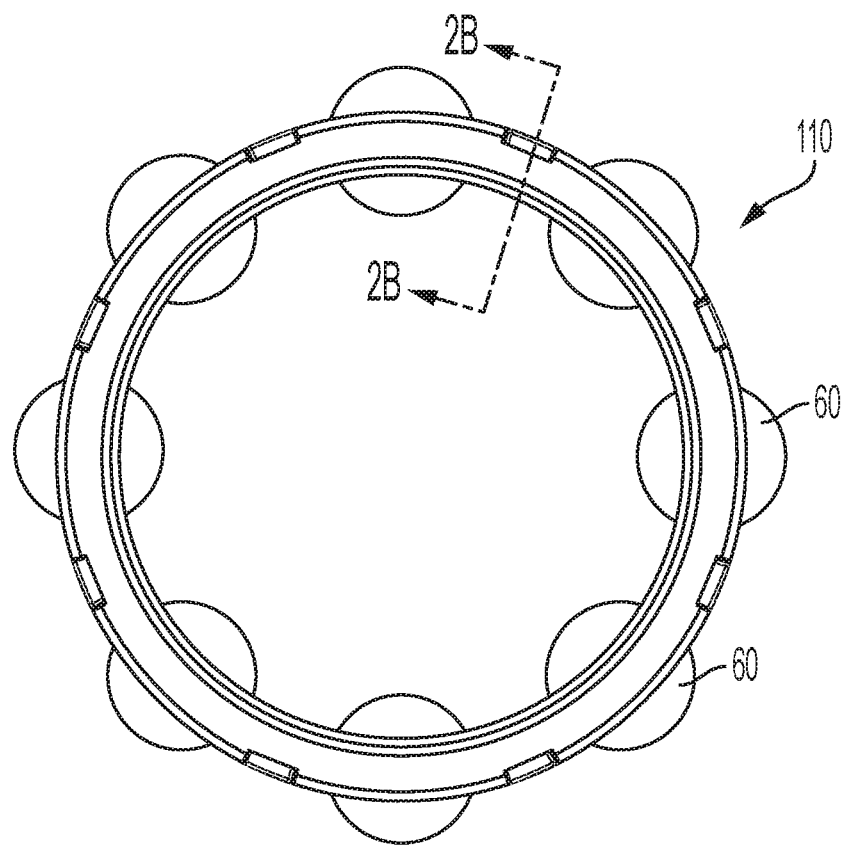
FIG. 2A is a front plan view of a bearing cage assembly according to a second embodiment.
Figure 2B:
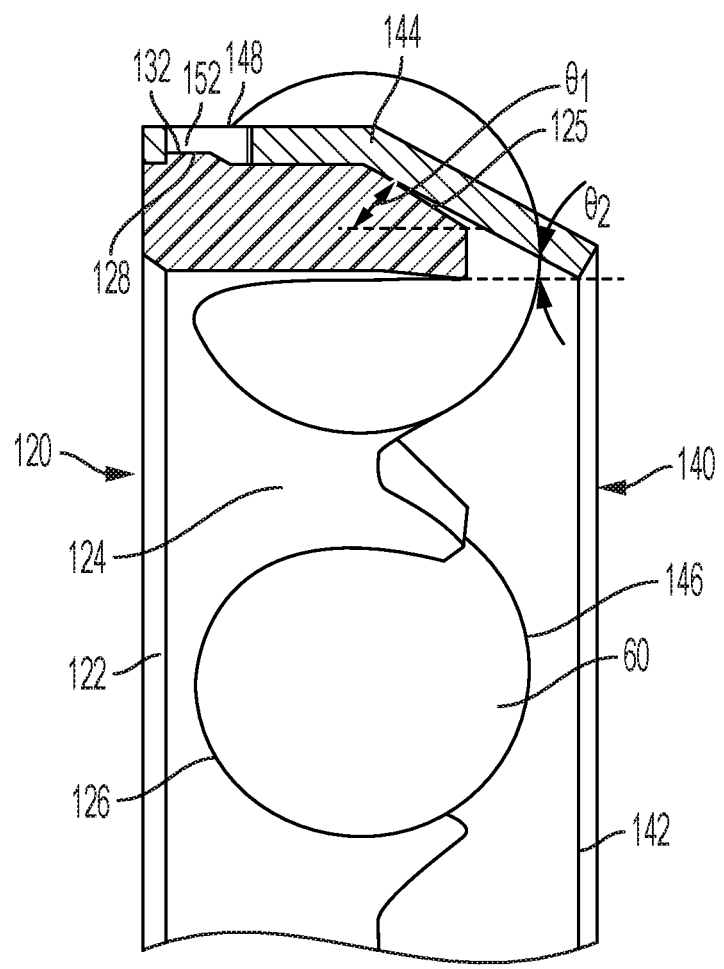
FIG. 2B is a cross-sectional view of the bearing cage assembly along line 2B-2B from FIG. 2A.
Figure 2C:
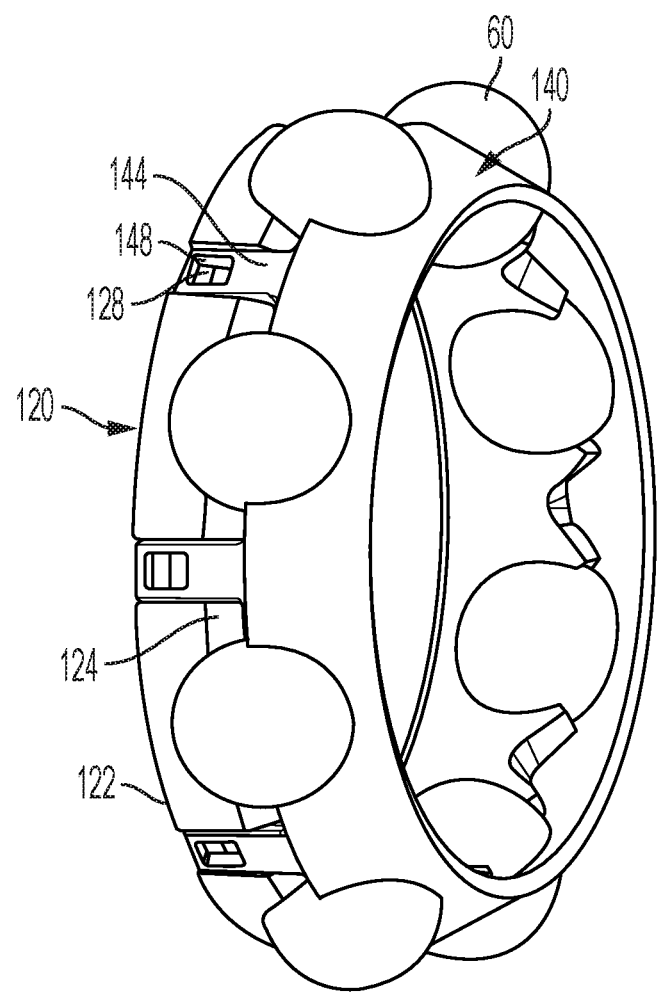
FIG. 2C is a perspective view of the bearing cage assembly of FIGS. 2A and 2B.

As best shown in FIGS. 1C and 2C, the two embodiments of the cage assemblies 10, 110 are similar except for the arrangement of the retainers. As shown in FIG. 1C, the retainers are internally situated such that the retainers are not visible once the two cage halves are assembled. As shown in FIG. 2C, the retainers remain visible while the two cage halves are assembled.

As shown in FIGS. 1D and 2D, the first rolling element pocket halves 26, 126 have a greater circumferential extent than the second rolling element pocket halves 46, 146. In other words, the first rolling element pocket halves 26, 126 extend around the rolling elements 60 to a greater degree than the second rolling element pocket halves 46, 146.

Generally, the embodiments disclosed herein provide an improved cage arrangement that provides a simplified assembly, while also providing a high capacity cage assembly which can handle stresses of high speed operation. Retention of the two cage halves is generally achieved by joining the two cage halves in a region of the rolling element pocket, and away from the rims of the two cage halves.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS cage assembly 10, 110
first cage half 20, 120
first rim 22, 122
plurality of recesses 123
first plurality of arms 24, 124
angled surface 125
first rolling element pocket half 26, 126
first retainer 28, 128
second cage half 40, 140
second rim 42, 142
second plurality of arms 44, 144
pocket 52, 152
plurality of fingers 145
second rolling element pocket half 46, 146
second retainer 48, 148
rolling elements 60

What is claimed is:

1. A bearing cage assembly comprising:
a first cage half formed from a first material, the first cage half including a first rim and a first plurality of arms extending from the first rim, adjacent arms of the first plurality of arms defining a rolling element pocket half of a first plurality of rolling element pocket halves, a plurality of first retainers defined between the first plurality of rolling element pocket halves;
a second cage half formed from a second material that is different from the first material, the second cage half including a second rim and a second plurality of arms extending from the second rim, adjacent arms of the second plurality of arms defining a rolling element pocket half of a second plurality of rolling element pocket halves, a plurality of second retainers defined between the second plurality of rolling element pocket halves,
first axial ends of the first plurality of arms each include a circumferentially extending slot defining a first one of a pocket or a protrusion, the circumferentially extending slot being enclosed in a radially inner direction and a radially outer direction, and second axial ends of the second plurality of arms each include a second one of a pocket or a protrusion, and
the first cage half and the second cage half are fastened to each other via engagement between the plurality of first retainers with the plurality of second retainers.

2. The bearing cage assembly of claim 1, wherein the first cage half is formed from plastic and the second cage half is formed from metal.

3. The bearing cage assembly of claim 1, wherein a quantity of the first plurality of rolling element pocket halves is equal to a quantity of the plurality of first retainers; and a quantity of the second plurality of rolling element pocket halves is equal to a quantity of the plurality of second retainers.

4. The bearing cage assembly of claim 1, wherein the first axial ends of the first plurality of arms each include a pocket, and the second axial ends of the second plurality of arms each include a protrusion dimensioned to be received within the pocket.

5. The bearing cage assembly of claim 1, wherein the first rim includes a plurality of recesses circumferentially aligned with the first plurality of arms, the plurality of recesses extending in a radially inward direction, the plurality of first retainers each being arranged within a respective recess of the plurality of recesses, the plurality of first retainers extending in a radially outward direction from the first rim.

6. The bearing cage assembly of claim 1, wherein the first cage half and the second cage half are fastened to each other via a snap-fit connection.

7. The bearing cage assembly of claim 1, wherein the plurality of first retainers are integrally formed with the first cage half and the plurality of second retainers are integrally formed with the second cage half.

8. A bearing cage assembly comprising:
a first cage half formed from a first material, the first cage half including a first rim and a first plurality of arms extending from the first rim, adjacent arms of the first plurality of arms defining a rolling element pocket half of a first plurality of rolling element pocket halves, a plurality of first retainers defined between the first plurality of rolling element pocket halves;
a second cage half formed from a second material that is different from the first material, the second cage half including a second rim and a second plurality of arms extending from the second rim, adjacent arms of the second plurality of arms defining a rolling element pocket half of a second plurality of rolling element pocket halves, a plurality of second retainers defined between the second plurality of rolling element pocket halves,
the first cage half and the second cage half are fastened to each other via engagement between the plurality of first retainers with the plurality of second retainers,
wherein the first plurality of arms each include an angled surface that is angled at a first angle, the second plurality of arms of the second cage are angled radially outwardly from the second rim by a second angle, and the first angle and the second angle are within 10% of each other.

9. The bearing cage assembly of claim 8, further comprising a plurality of fingers each extending from a respective arm of the second plurality of arms, the plurality of fingers having a narrower width than a width of the second plurality of arms.

10. The bearing cage assembly of claim 9, wherein the first rim includes a plurality of recesses circumferentially aligned with the first plurality of arms, the plurality of first retainers each being arranged within a respective recess of the plurality of recesses, and the plurality of fingers each being dimensioned to be received within a respective one of the plurality of recesses.

11. The bearing cage assembly of claim 10, wherein the plurality of first retainers are formed as a plurality of protrusions, and the plurality of fingers defining a plurality of pockets as the plurality of second retainers, and the plurality of pockets are each dimensioned to receive a respective one of the plurality of protrusions.

12. A bearing cage assembly comprising:
a first cage half formed from a first material, the first cage half including a plurality of first retainers defined between a first plurality of rolling element pocket halves;
a second cage half formed from a second material that is different from the first material, the second cage half including a plurality of second retainers defined between a second plurality of rolling element pocket halves, and the first cage half and the second cage half are fastened to each other via engagement between the plurality of first retainers with the plurality of second retainers, wherein at least one of the plurality of first retainers or the plurality of second retainers are formed as openings in a radial direction having an enclosed perimeter.

13. The bearing cage assembly of claim 12, wherein the first cage half is formed from plastic and the second cage half is formed from metal.

14. The bearing cage assembly of claim 12, wherein the first cage half and the second cage half are fastened to each other via a snap-fit connection.

15. The bearing cage of assembly of claim 12, wherein a first portion of the first cage half and a second portion of the second cage half each include angled surfaces relative to an axis of rotation of the bearing cage, and the angled surfaces abut each other in an assembled condition.

16. The bearing cage assembly of claim 12, wherein the plurality of first retainers are integrally formed with the first cage half and the plurality of second retainers are integrally formed with the second cage half.

17. The bearing cage assembly of claim 12, wherein the first plurality of retainers are formed as protrusions and the second plurality of retainers are formed as the openings.

\* \* \* \* \*